United States Patent Office 2,758,884
Patented Aug. 14, 1956

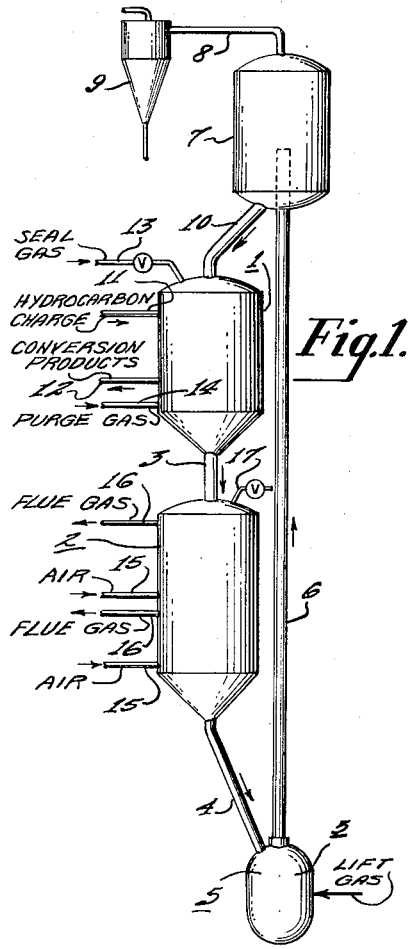
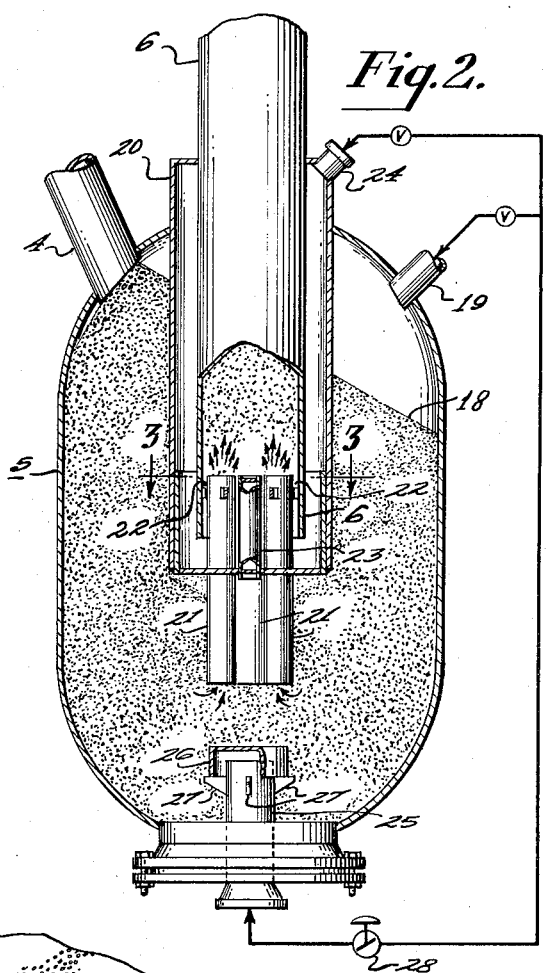
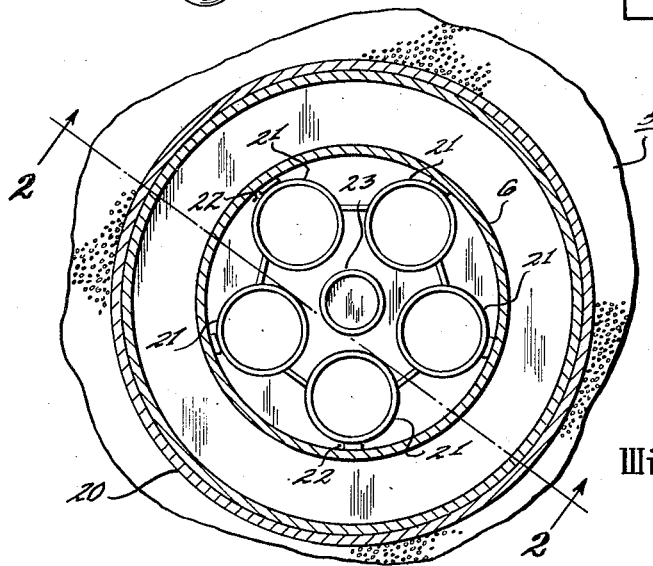

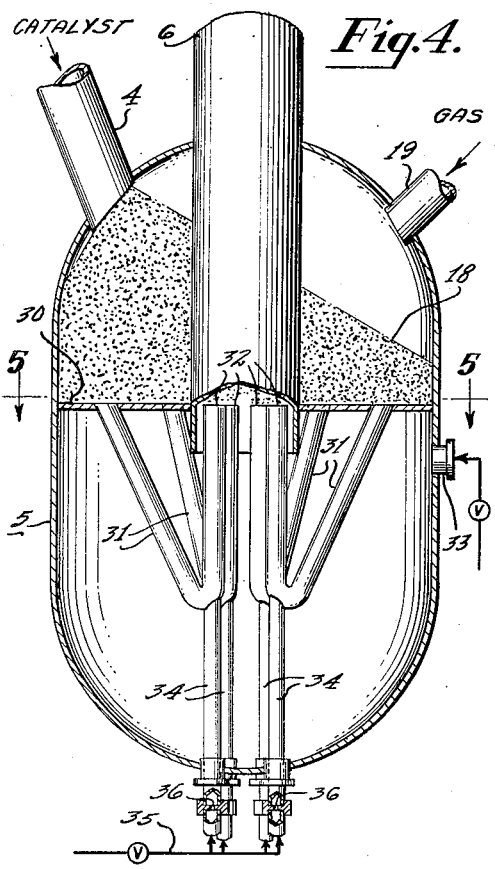
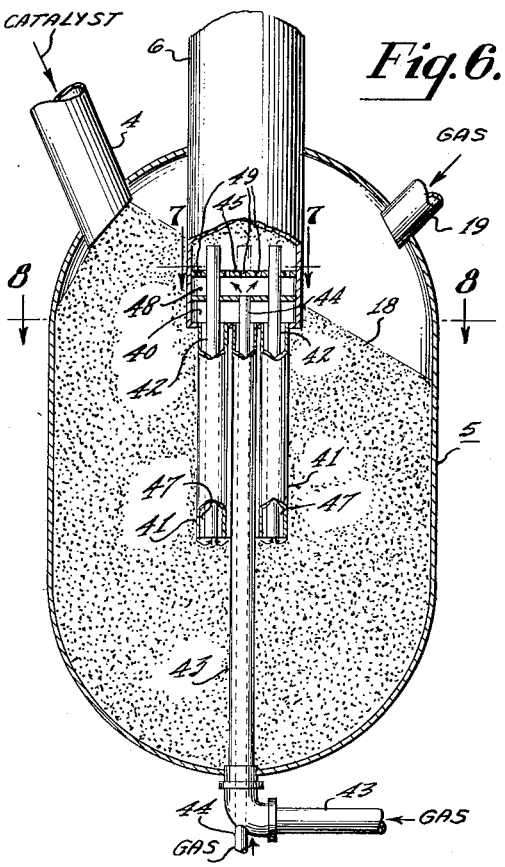
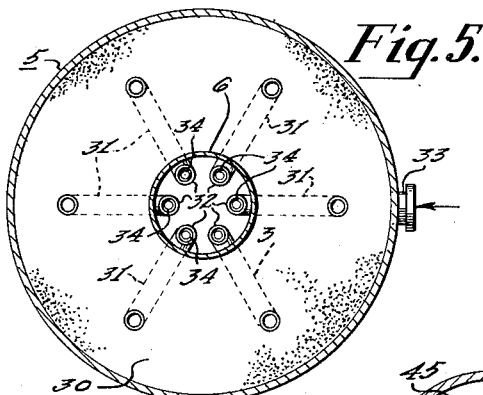
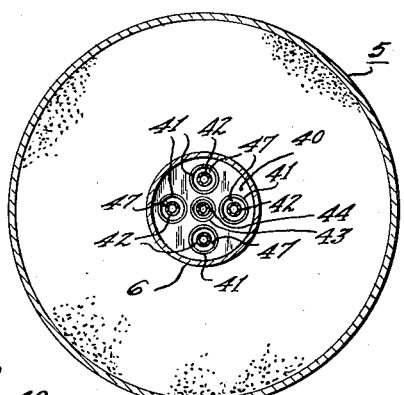
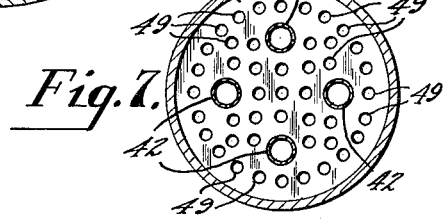
INVENTOR
William W. Weinrich
BY
ATTORNEY

2,758,884

TRANSFER AND CIRCULATION OF SOLID GRANULAR MATERIAL

William W. Weinrich, Wallingford, Pa., assignor to Houdry Process Corporation, Wilmington, Del., a corporation of Delaware Application June 28, 1950, Serial No. 170,874

9 Claims. (Cl. 302—57)

The present invention relates to improvements in method and means for transfer and circulation of solid granular material of discrete particle size. The invention finds its most important application in connection with systems wherein catalyst or other contact mass in granular form and of comparatively large particles size, subject to attrition by impact and friction, is continuously circulated to and from a reaction zone and is elevated from a lower to a higher level through a substantial height during the course of such circulation. Familiar examples of such systems are those employed in hydrocarbon conversion processes.

Typical hydrocarbon conversion processes utilizing solid granular catalyst include: cracking, dehydrogenation, aromatization, reforming and the like. In these and other hydrocarbon conversion processes the catalyst, as a result of reactions taking place during contact with the hydrocarbon charge, usually accumulates thereon a carbonaceous or hydrocarbonaceous deposit called coke, formed as a by-product of such reactions, resulting in lowering the activity of the catalyst. Accordingly, it is the usual practice periodically to subject the used catalyst to regeneration by combustion of the deposited coke, in air or other oxygen-containing gas.

In moving catalyst systems, the catalyst is continuously passed through the hydrocarbon conversion zone and the resulting coke-containing catalyst discharged therefrom is transferred to a separate vessel or zone for regeneration. Since in the usual moving catalyst systems of this type, the catalyst during its course of circulation passes downwardly from a higher to a lower level, it is necessary to return the catalyst to the upper level for repetition of the cycle of operations. While earlier commercial installations employed mechanical means, such as bucket elevators, for transporting the catalyst to the required elevation, in more recent designs elevation of the catalyst is effected in a pneumatic lift. (See "Houdriflow: New Design in Catalytic Cracking," Oil and Gas Journal, January 13, 1949, at page 78).

It has been demonstrated that granular solids may be smoothly introduced into lift pipes of comparatively small diameter and may be efficiently transported through such small diameter pipes with desired low attrition losses, when the granular solid is introduced into the lift pipe in proper manner, and appropriate lift conditions are maintained which obtain suitable concentration of the moving particles in the lift and linear velocities at which such particles move upwardly in substantially straight line flow. As the diameter of the lift pipe is extended to greater and greater size for the purpose of handling the required large quantities of granular solid, the attainment of straight line flow at the inlet to the lift and within the lower portion thereof becomes exceedingly difficult, because of augmented tendency to lateral flow of the particles with increasing momentum and conditions favoring turbulence, with the resulting introduction of factors tending to cause attrition.

It has now been found that improved lifting of granular solid materials can be achieved even in lift conduits of comparatively large diameter and free of the above difficulties, if such granular material is initially accelerated upwardly through a comparatively narrow feeder passage discharging into the main lift conduit, thereby minimizing or eliminating the possibility of deviation from straight line flow. In accordance with the invention the solid granular material is initially lifted under the impelling influence of lift gas through a comparatively narrow laterally confined passage and discharged therefrom as an upwardly moving stream into the principal lift path of larger cross section, wherein the flowing mass of solids is contacted with the remainder of the lift gas for transporting the solid material through the required vertical distance. By operating in this manner, and particularly by engaging the entire lateral periphery of the emerging stream of solids with upwardly moving lifting fluid, introduction into the wider path is accomplished smoothly and free of those factors contributing to attrition when otherwise introducing solid material directly into a lift conduit of large diameter. Moreover, since the additional transporting gas introduced into the expanded path contacts solid material that is already moving positively upward; that gas, which generally constitutes the major portion of the total gas required for upward transportation of the solid material, can be supplied at lower pressure than would be required for initial upward acceleration of that material.

In accordance with the preferred embodiment of the invention, granular catalyst or other granular contact mass is introduced into an upwardly directed lift conduit by means of one or more feeder pipes or other passage-forming means discharging upwardly into said conduit, the feeder passages thus provided being narrower in internal wall to wall distance than the lift conduit into which the same discharge; the total cross section of such passages will also be smaller than that of the lift conduit. At the level of expansion of the catalyst path, that is, where the feeder pipe or pipes discharge upwardly into the main lift conduit, additional lift gas supplied contacts the moving stream or streams of catalyst discharged from the feeders. The gas added in the expanded path maintains continuous upward movement of the catalyst in the expanded path at conditions controlled by the rate at which such gas is supplied. The amount of gas thus added in practical operation is such as will provide a linear gas velocity in the expanded area in excess of the required supporting velocity for the catalyst discharged from the feeder, and will preferably be at least sufficient to compensate any tendency of the catalyst to decelerate as it enters the expanded path of the principal lift conduit.

In accordance with one aspect of the present invention the mass of catalyst or other granular contact mass is flowed through the feeder pipe or passage under conditions of relatively high concentration, and as the catalyst leaves the feeder pipe it is immediately reduced in concentration, but is maintained under conditions effecting desirably high mass throughput and continued flow in substantially straight line pattern. In this manner fairly large amounts of catalyst can be fed to the principal lift at required pressure with a relatively small amount of lift gas, and then transported therein by added gas through the remainder of the lift path with comparatively small pressure drop therein. In accordance with this aspect of the invention, the density of the catalyst in the feeder pipe will be generally in excess of about 10% of its settled bulk density and can be as high as about 50% or more of the settled bulk density, in contrast to the average density prevailing in the principal lift which will ordinarily be less than ½ of that in the feeder and rarely as high as 15 to 20% of the settled bulk density of the catalyst. Thus, with catalyst having a settled bulk density of about 45 pounds per cubic foot (such as 4 mm. cylindrical pellets of acid activated clay) the feeder can be operated at a density of about 15 to 25 pounds per cubic foot at the point of discharge into the principal lift conduit, while the latter is operated at an average density of about 2 to 5 pounds per cubic foot or less if desired.

Although the invention finds its most important use in connection with lift apparatus of a size requiring for the desired catalyst circulation rate lift pipes in excess of about 12" in diameter, where the problem of turbulence at the inlet thereto and other causes of attrition may be particularly serious, it will be understood that the invention is not limited thereto and may be employed in connection with lift pipes of smaller diameter to facilitate catalyst introduction into the main lift and to increase operating flexibility. In general, it is preferred to employ feeder pipes of less than about 12" in diameter and preferably of not more than about 9" in diameter, since catalyst may be easily introduced and handled in pipes of this small size without material turbulence and accompanying attrition. Particularly when the cross sectional area of the principal lift conduit is more than about twice that of the feeder, it is preferred to employ a plurality of feeders of smaller size rather than a single feeder of larger diameter. In employing a plurality of feeders these are advantageously arranged in a uniformly spaced pattern to obtain good distribution of the catalyst over the cross section of the lift conduit.

The solid materials with which the invention is specially concerned are those having an average particle size in the order of about 14 mesh and larger, and including coarse granules of such size as well as the typical commercial bead and molded pellet catalysts of about 2–5 mm. size. The improved design and operation finds particular advantage in the handling of materials that are fairly dense, such as those having an apparent bulk density of at least 20 pounds per cubic foot under random packed conditions. Particles of the indicated size and density are distinguished by the property of flowing freely in bulk non-fluidized state, as when discharged from a bin or hopper, in contrast to light or more finely divided or powdered materials which, particularly when of diverse size range, tend to agglomerate and pack and can be flowed freely only when converted to so called "fluidized" state and handled as flowing liquids.

The present invention will be understood and other advantages thereof appreciated from the detailed description which follows read in connection with the accompanying drawings illustrating certain forms of apparatus adapted for the practice thereof, as applied to a hydrocarbon conversion system. In these drawings Figure 1 is a schematic view in elevation showing the general arrangement of processing vessels and transporting lift;

Figure 2 is a largely diagrammatic longitudinal cross section of the lift hopper and the bottom portion of the lift conduit, portions being broken away to show internal structure;

Figure 3 is an enlarged transverse section taken on the line 3—3 of Figure 2;

Figures 4 and 6 are views similar to that shown in Figure 2, illustrating modified structural embodiments;

Figures 5 and 8 are transverse sections taken respectively on the line 5—5 of Figure 4 and line 8—8 of Figure 6.

Figure 7 is an enlarged transverse section taken on line 7—7 of Figure 6.

In the system illustrated in Figure 1, a hydrocarbon conversion reactor 1 is superimposed over a kiln 2, and is in solids flow communication therewith by means of a conduit 3. Catalyst discharged from the bottom of kiln 2 passes by means of a conduit 4 into the lift hopper 5, wherein it is engaged by a lift gas and is impelled upwardly into the lift conduit 6 and transported therethrough by lift gases into a disengaging vessel 7. In the disengaging vessel, as a result of the expanded cross section, the catalyst settles out from the gas stream and the gas is withdrawn overhead by means of a discharge line 8. Means may be provided in line 8 for separation of any fines from the gas stream, such as the cyclone separator indicated at 9. The catalyst separated from the gas in the disengaging vessel 7 gravitates to the bottom of that vessel and is discharged therefrom by means of a conduit 10 feeding into the top of reactor 1.

The catalyst gravitates in the reactor 1 as a compact bed and hydrocarbons are passed through the bed for the required catalytic conversion. Thus, as schematically illustrated in Figure 1, the hydrocarbons can be introduced through a line 11 to flow concurrently with the catalyst, conversion products being discharged from the reactor through a line 12. A supply line 13 is provided at the top of the reactor for the admission of steam or other inert gas as may be required for maintaining the desired pressure at the top of the reactor, to serve as seal gas in the conduit 10, and to provide, if desired, process steam in the reactor. Prior to discharge from the reactor 1 the catalyst passes through a purge zone near the bottom thereof, wherein it is contacted with steam or other inert gas, admitted as illustrated through line 14.

The coke-containing catalyst discharged from the reactor 1 passes by means of conduit 3 into the kiln 2, through which it gravitates as a compact bed while contacted with oxygen-containing gas, such as air, to effect combustion of the coke. Various types of kilns of the compact moving bed type are known to the art and may be employed in the described system. In accordance with the embodiment illustrated in Figure 1, the regenerating gas is introduced at several points into the kiln as by means of line 15 to flow countercurrent to the descending bed of catalyst, the resulting combustion products being removed as flue gas through lines 16. In appropriate conditions, depending upon the operating pressure at the bottom of the reactor 1 and at the top of the kiln 2, seal gas may be introduced into the top of the kiln through a line 17, a portion of which gas will flow upwardly through the leg 3 thereby preventing admixture of incompatible gases between the reactor and the kiln. If the pressure at the bottom of the reactor exceeds that at the top of the kiln, the separate introduction of seal gas through line 17 is not necessary; a portion of the purge gas introduced through line 14 may be permitted to flow downwardly through the conduit 3 passing out with combustion products discharge at the top of the kiln.

The regenerated catalyst entering hopper 5 through conduit 4 is contacted with lift gas introduced in appropriate manner, hereinafter more fully described, thereby effecting elevation of the catalyst into the lift conduit 6 for repetition of the described cycle.

In the embodiment illustrated in Figures 2 and 3, the catalyst entering the engager hopper 5 forms a bed therein assuming a normal angle of repose as indicated by the upper surface of the catalyst bed 18. The hopper 5 is provided with an inlet 19 for gas above the surface of the catalyst bed. Lift conduit 6 passes through the top of the hopper terminating, as shown, within the hopper. That portion of the lift conduit within the hopper 5 is surrounded by a concentric sleeve 20 which is closed at top and bottom thereof. Feeder pipes 21 are mounted in and pass upwardly through gas-tight openings provided in the bottom of sleeve 20. The number of such feeder pipes employed will depend upon the size of the lift conduit 6 and the relative size of the feeder pipes. In the illustrated embodiment (see Figure 3) five of such feeder pipes are shown, arranged symmetrically approximate the inner periphery of lift conduit 6. The upper portions of the feeder pipes 20 extend for a short distance above the bottom periphery of lift conduit 6 and are spaced from the inner wall of that conduit to provide a gas passing passage 22 approximate the inner wall of the conduit. As shown in Figures 2 and 3, there may be further provided at the approximate center of the circular pattern of feeder pipes 21, a closed cylindrical member 23, affixed to the bottom of sleeve 20 and terminating within lift conduit 6 at or near the discharge outlets of the feeder pipes 21. The sleeve 20 is provided with an inlet 24 for admission of gas into the sleeve.

In operation of the described embodiment, lift gas is admitted through the inlet 19 filling the space above the surface 18 of the catalyst bed and passing downwardly through the bed toward the inlets of the feeder pipes 21. The gas then passes upwardly into the feeder pipes and in so doing impels catalyst into and through the feeder pipes, the gas and catalyst being discharged into the lift conduit 6.

If desired, additional gas may be introduced into the catalyst bed within the hopper 5 to assist in elevating the catalyst into the feeder pipes 21. For instance, such gas may be introduced by means of a diffusing nozzle 25 entering through the bottom of the hopper, the nozzle being provided with a cap or shield 26, supported from the nozzle by struts 27, to prevent catalyst from falling into the nozzle. Instead of the single diffuser nozzle shown in Figure 2, each of the feeder pipes 21 may be provided with an individual gas jet in line therewith and spaced from the bottom thereof a suitable distance, permitting flow of catalyst between the jet and the feeder pipe, such jets being positioned to direct gas upwardly into the respective feeder pipes. The gas admitted into the sleeve 20 through its inlet 24 and the gas admitted above the bed through inlet 19, as well as the gas entering the hopper through the nozzle 25, may be supplied from a common source, suitable means being provided to control the proportioning of the gas to the various points of admission. Various known forms of automatically controlled valves and proportioning devices may be employed for this purpose. For instance, a simple control of proportionate flow between gas entering through inlet 19 and that entering the catalyst bed through nozzle 25, if that nozzle is employed, may comprise a butterfly valve 28 in the line leading to the nozzle.

In the type of arrangement shown in Figure 2, for instance, generally the major portion of the total lift gas, and up to about 90% thereof, will be admitted through the sleeve 20 by means of its inlet 24, the remaining portion being admitted to the lift conduit 6 together with the catalyst transported thereby through the feeder pipes 21; that remainder of the gas being admitted either into or above the bed or at both points as hereinbefore described. This proportion is easily achieved, since the pressure drop in the sleeve 20 will ordinarily be considerably lower than that existing through the catalyst bed; while the split in flow of the gas to the inlet 19 and the nozzle 25 can be adequately controlled, irrespective of the difference in pressure, by means of the butterfly valve 28. The described arrangement permits wide flexibility in control of flow of the catalyst into the lift pipe 6 by controlling the rate of gas admission at the several points described, to meet any particular conditions encountered.

The major portion of the lift gas which is admitted to the sleeve through inlet 24 must reverse its direction of flow in passing upwardly into the lift conduit 6. The external walls of the feeder members 21 as well as of the member 23 thus may serve as straightening and directing vanes so that the gas at its point of contact with the streams of catalyst admitted through the feeder pipes 21, is travelling substantially vertically upward approximately parallel with the discharging catalyst streams. Moreover, in the embodiment shown, the stream of catalyst emerging from the discharge outlet of each of the feeder pipes 21 is laterally surrounded and enveloped by an upwardly directed stream of gas tending to confine the catalyst stream within its path and materially reducing the tendency of the catalyst to move laterally with significant velocity toward the inner walls of the lift conduit 6 or toward an adjacent catalyst stream, which tendency might otherwise be encountered as a result of the expanded path. In this manner substantial uniformity of contact of gas with solids over the area of the path is obtained, and turbulence of the catalyst in the zone of introduction into the large main lift conduit is avoided or materially reduced and catalyst attrition from this and other causes minimized.

In the modified embodiment shown in Figures 4 and 5, catalyst enters the engager hopper 5 by means of conduit 4 in the same manner as in the previously described embodiment; however, in this instance, the bed of catalyst is supported by a tube sheet 30 extending across and partitioning the hopper. The lift pipe 6 extends through a suitable opening provided centrally in the tube sheet. Catalyst discharge openings having downcomers 31 are arranged in symmetrical pattern in the tube sheet between the wall of the hopper 5 and the external wall of the lift conduit 6. Each of the downcomers 31 slopes inwardly and downwardly to a point below the bottom perhiphery of lift conduit 6, and then turns upwardly to form a vertical leg 32, which passes into the lift conduit 6.

The hopper 5 is provided below the tube sheet 30 with a gas inlet 33; gas admitted therethrough passes upwardly into the lift conduit 6 around the catalyst legs 32. Each of the catalyst downcomers or feeders 31, as particularly illustrated in Figures 4 and 5, is shown as provided with an individual gas supply line 34 in line with each of the vertical legs 32.

In the operation of this embodiment, catalyst entering the hopper 5 and supported on the tube sheet 30, descends into the catalyst downcomers 31 to the point of intersection of the vertical leg 32, at which point the catalyst is picked up by a stream of gas discharged into the leg through line 34 and transported thereby through the leg into the lower portion of lift conduit 6. As the stream of catalyst emerges from the discharge outlet of the feeder leg 32 it is picked up by the gas stream passing into that conduit from below the tube sheet 30 and supplied through the inlet 33. It will be observed, that here as in the preceding embodiment the lift gas entering conduit 6 externally of the feeder legs 32, surrounds and envelopes the stream of catalyst emerging from each feeder leg.

By the admission of gas above the catalyst level 18 in suitable amount, a pressure differential can be established between that point and the discharge outlets of the legs 32 tending to effect movement of the catalyst upwardly in the legs 32 for discharge into the lift conduit 6. The provision of the separate gas inlets 34 is preferred, however, to reduce the total pressure drop in the feeders and to avoid possible catalyst attrition and erosion of the pipes that might otherwise occur in forcing catalyst around the bend. In the illustrated arrangement the flow of catalyst through the slanted portion of the downcomers 31 to the bend can be entirely under the influence of gravity. If desired, however, a small positive gas flow may be provided through the bed supported on the tube sheet 30 in addition to the gas admitted through the lines 34. Gas thus admitted to the space above the catalyst bed can also serve as seal gas.

As in the embodiment described in Figure 2, only a minor portion of the total lift gas need enter the conduit 6 through the feeder legs 32, the major portion of the lift gas being supplied directly to that conduit and externally of the feeder legs.

The gas admitted through the inlet 33 and through the lines 34 may be supplied from separate sources, or it may be manifolded from a common supply line, suitable provision being made for proportioning of the gas in required manner. Advantageously the respective gas lines 34 are controlled to supply equal quantities of gas to the legs 32. Thus, the gas lines 34 may be fed from a common manifold 35 and the branch lines therefrom provided with equalizing orifices as indicated at 36.

In the embodiment illustrated in Figures 6 and 7 the gas employed for introducing catalyst into the feeder pipes and for transporting it through such pipes into the lift conduit, is admitted as an annular stream peripherally surrounding the inlet of each feeder pipe. Thus, as shown, there is provided near the upper part of the hopper 5 a gas manifold 40, having tubular sleeves 41 depending therefrom arranged in a symmetrical pattern and surrounding a corresponding number of lift feeder pipes 42. The feeder pipes 42 extend downwardly from a point within lift conduit 6 to a point below the level 18 of the catalyst bed in the hopper 5. Gas is supplied to manifold 40 by a line 43. An additional gas supply line 44 passes concentrically through line 43 and through the manifold 40 into conduit 6, terminating at a point below the discharge level of the feeder pipes 42. At a level intermediate the discharge outlets of the feeder pipes 42 and that of the gas supply line 44, within the lift conduit 6, there is mounted a perforated plate 45; the feeder pipes 42 extend through the plate 45 in passing into the lift conduit 6. It will be noted that the bottom of lift conduit 6 is closed off by the top of the manifold 40 or by a separate plate welded thereto at that location and provided with gas-tight openings therein for the feeder pipes 42 and for the gas supply line 43.

In the operation of this embodiment, gas supplied to the manifold 40 through pipe 43 passes downwardly through the annular space 47 between the feeder pipe 42 and the respective sleeve 41 surrounding the same, and is discharged as an annular stream, which passes for a short distance into the catalyst bed therebelow, then reverses direction and passes upwardly into the feeder pipes 42, picking up a portion of the catalyst from the bed and transporting the same through the feeder pipe into the lift conduit 6. The gas admitted through supply line 44 enters a chamber 48 formed below the perforated plate 45 and then is distributed uniformly over the cross section of conduit 6 in passing upwardly through the perforations 49 in the plate. The gas thus admitted through the plate 45 engages the streams of catalyst discharged from the respective feeder pipes 42 and as in the previously described embodiments continues the transportation of the catalyst upwardly through the lift conduit 6.

In this embodiment, as in the embodiments previously described, additional gas may be diffused, if desired, through the catalyst bed in hopper 5 to assist in the pick-up of catalyst by the annular gas stream discharged from the sleeves 41. Such additional gas may be brought in above the level 18 of the catalyst bed at inlet 19, or at one or more points within the bed. Also, instead of employing gas generally diffused through the bed, or in addition thereto, each of the feeder pipes 42 may be provided with an individual gas supply jet suitably spaced therebelow and in line therewith to supplement the gas admitted to the feeder pipe from the surrounding sleeve.

Common to all of the described embodiments a stream of upwardly moving lift gas engages one or more streams of catalyst which are already moving positively upward in substantially straight lines, within a laterally enclosed path of larger cross sectional area than that of the catalyst stream or streams discharged into that path. This stream of gas is supplied at a controlled rate at least sufficient to supplement that entering with the catalyst streams to continue upward movement of the catalyst after it enters the expanded path, and maintain such movement under desired conditions of smooth flow. Within the expanded path bounded by the principal lift conduit, the ratio of gas to solids is materially increased and the catalyst entering the principal lift conduit is well distributed over the cross sectional area thereof. By the addition of the second lift gas in a manner to completely surround the moving stream or streams of catalyst entering the principal lift conduit, rapid dispersion of catalyst in the gas stream is obtained with uniform concentration of the catalyst in the lift conduit within a very short distance above the lift entrance. That gas which enters the principal lift conduit along the inner periphery of the walls thereof tends to prevent catalyst particles from striking the walls and thus minimizes erosion and attrition. Advantageously the admission of catalyst into the principal lift conduit can be so arranged that the lift gas passing into engagement with the moving catalyst stream discharged into the principal lift conduit approaches along a line parallel to the lift axis, thereby avoiding imparting of a substantial horizontal velocity component to the catalyst particles, thus reducing possible attrition of catalyst as a result of lateral impact and turbulence.

In the operation of the described system the quantity of solid material that is introduced through each feeder is advantageously controlled by the rate at which gas is supplied thereto. At extremely low gas flow rates and correspondingly low mass flow rates of solid, smooth flow of solid material through the feeder is more difficult to achieve. It has been found, however, that in a system such as that illustrated in Figure 2, the desired smooth flow of catalyst (of about 40–60 pounds per cubic foot bulk density and of about 5–10 mesh size) through the feeders is readily obtained when air (at room temperature) is supplied thereto at the rate of at least about 1.5 pounds per square foot per second, obtaining a pressure gradient in the feeder of at least about 20 pounds per square foot per foot. Under these conditions it is assured that the flow of solids is relatively free from any tendency to slugging and the particles of solid will tend to travel through the feeder in streamline flow. The relation of gas flow rate to the catalyst circulation rate and other flow conditions obtaining in the feeders will be appreciated from the following table, the data therein being based on the use of air at room temperature, lifting catalyst of preponderantly 5–10 mesh size having a settled bulk density of about 45–55 pounds per cubic foot:

|   | Air supply rate, lbs./(ft.²) (sec.) | Solids flow, lbs./(ft.²) (sec.) | Conc. of solids at discharge, lbs./ft.³ (approx.) | Pressure drop in feeder, in. H₂O/ft. length |
|---|---|---|---|---|
| 1 | 1.93 | 115 | 23 | 5 |
| 2 | 2.73 | 172 | 15.5 | 6.7 |

At the lower air rate given in the above table, the catalyst is discharged from the feeders at a linear velocity of about 5 feet per second and is increased to over 10 feet per second at the higher gas rate. As the gas supply rate is increased further, the mass flow rate of the solids and the linear velocity of such solids is correspondingly increased.

In systems where hot lift gas is employed, as will ordinarily be the case in hydrocarbon conversion systems, the same mass flow rate of solids, such as catalyst, is obtained by supplying the gas at considerably lower mass rate than in the case of room temperature air reported in the table. Thus if flue gas, which can be supplied from combustion products of regeneration in the kiln, is employed as the lift medium supplied to the feeders at about 1000° F., the gas supply rate need be approximately only ½ of that required for room temperature air to obtain the same mass flow rate of catalyst.

The following illustrates an operation designed to circulate catalyst of the size and density described in a 150–200 foot lift of 19 inch internal diameter, employing flue gas (or air) at 1000° F.

Catalyst particle diameter_____in__ 0.156
Bulk density_____lbs./ft.³__ 50
Pellet density_____lbs./ft.³__ 80
Maximum linear velocity_____ft./sec__ 30
Disengager pressure_____p. s. i. gauge__ 0.3

For a catalyst circulation rate of about 144 tons per hour, at the stated conditions, a total gas supply of 3900 S. C. F. M. (@ 60° F. and 1 atmosphere) is adequate.

If the catalyst is discharged into the lift conduit by means of a single feeder of 12 inch diameter, and the gas is supplied to the feeder at the rate of 860 S. C. F. M., the catalyst will attain a discharge velocity at the feeder outlet of approximately 8 feet per second and have a concentration of about 12.5 pounds per cubic foot. The remainder of the gas will be supplied to the lift conduit proper at the rate of 3040 S. C. F. M. Instead of a single 12 inch feeder, four six-inch feeders may be employed under approximately the same conditions.

If it is desired to step up the catalyst circulation rate in the same system, this may be readily accomplished by increasing the rate at which gas is supplied to the feeders. For example, the catalyst circulation rate is increased to 200 tons per hour by supplying flue gas (at 1000° F.) to the feeders at the rate of 1160 S. C. F. M., under which conditions the catalyst will have a discharge velocity therefrom of about 12.6 feet per second and a concentration of about 11 pounds per cubic foot.

Obviously many modifications and variations of the invention as hereinbefore set forth may be made without departing from the spirit and scope thereof and therefore only such limitations should be imposed as are indicated in the appended claims.

I claim as my invention:

1. The method of transporting friable granular material from a lower to a higher level, which comprises continuously flowing such granular material as a compact moving mass into and downwardly within a gas contacting zone, engaging the granular material in said zone with an upwardly directed stream of lift gas introduced within said mass in an amount sufficient to effect lifting of the granular material thereby, admitting said lift gas together with the granular material lifted thereby into an initial confined feeder path of relatively narrow dimension having its lower end located within said mass, transporting the granular material under the influence of said gas in said initial narrow path through a vertical distance, discharging the catalyst and gas as a confined stream into a transporting path of wider dimension than said initial path and having communication with said contacting zone only through said feeder path, engaging the granular material in said stream within said wider path with an upwardly moving column of additional lift gas surrounding said stream, said column of additional gas being admitted to said wider path at a rate sufficient to maintain continued upward movement of the granular material in the widened path, and transporting said granular material directly upwardly through said wider path under the influence of the lift gases while maintaining the average concentration of granular material in said wider path substantially less than that prevailing in said initial narrow path.

2. The method in accordance with claim 1, wherein said additional lift gas is supplied to said wider path at a rate at least sufficient to continue upward movement of granular material engaged thereby at a linear velocity not less than that at which said granular material is discharged into said wider path.

3. The method in accordance with claim 1, wherein said additional lift gas is supplied to said wider path at a rate sufficient to impart additional acceleration to the granular material engaged thereby.

4. The method of transporting friable granular material under smooth flow conditions through an upwardly directed confined lift path, the granular particles being predominantly of about 5–10 mesh size and having an apparent bulk density of 40–60 pounds per cubic foot, said method comprising initially lifting the granular material through a comparatively narrow confined feeder path by the impelling influence of transporting gas flowed upwardly through such feeder path at a rate resulting in a pressure gradient within said feeder path of at least 20 pounds per square foot per foot, discharging said granular material upwardly from the feeder path into a substantially wider laterally confined transporting path, engaging the granular material so discharged with additional transporting gas, separately introduced into said transporting path below the level of discharge of said feeder path and continuing smooth upward transportation of the granular material within said wider path by flowing the combined gas throughout the vertical extent of said transporting path at a linear velocity substantially greater than the linear velocity of the granular material.

5. Apparatus for elevating solid granular material by fluids, comprising a pressure sealed transfer hopper, means for continuously admitting solids to said hopper, and upright lift conduit extending upwardly from said hopper and having a portion including its inlet end within the hopper, a housing spaced from and surrounding the outer periphery of said lift conduit, said housing being closed at top and bottom and being in gaseous communication with said lift conduit, an open ended feeder pipe or narrower dimension than said lift conduit, said feeder pipe having its outlet end within the lift conduit and its inlet end below the bottom of said housing, means for admitting fluid to said hopper into the space therein external to said housing, whereby said fluid is caused to flow upwardly into said feeder pipe together with solids impelled thereby, and means for admitting additional fluid directly to said housing for flow into said conduit and into engagement with fluid and solids discharged into said conduit by said feeder pipe.

6. Apparatus for elevating solid granular material by fluids, comprising a pressure sealed transfer hopper adapted to contain a bed of solid material, an upright lift conduit of large diameter extending upwardly from the hopper to a zone of discharge, a plurality of small diameter feeder pipes each having an outlet opening upwardly into the lift conduit and having an inlet arranged to admit solids thereto from within the hopper, means for admitting fluid under pressure into the hopper for flow through the solids bed therein and conveyance of said solids through said feeder pipes into said lift conduit, and means for supplying fluid directly to the lift conduit externally of said feeder pipes and arranged to supply such fluid below the outlets of said feeder pipes, said last-mentioned fluid supplementing the fluid discharging from said feeder pipes to continue the upward movement of said solids through said lift conduit.

7. Apparatus for elevating solid granular material by fluids comprising a pressure-sealed transfer hopper adapted to contain a bed of solid material, an upright lift conduit extending upwardly from within the hopper to an elevated zone of discharge, means for introducing a wholly confined stream of fluid into the lower end of said lift conduit, means for introducing additional fluid into said hopper, feeder means for conveying at least one confined stream of the last-mentioned fluid together with solids impelled thereby from said bed into the lower region of said lift conduit and discharging the same within said lift conduit at a level spaced a substantial distance above the introduction level of the first-mentioned fluid, said feeder means providing the sole means of communication between said bed of solid material and said lift conduit and being of substantially smaller flow area than said lift conduit.

8. Apparatus as defined in claim 7 in which at least a portion of said last-mentioned fluid is introduced into said hopper above the surface of said bed.

9. Apparatus as defined in claim 7 in which said means for introducing a wholly confined stream of fluid into the lower end of said lift conduit comprises a chamber in open communication with the lower end of said lift conduit and means for introducing fluid to said chamber.

(References on following page)

References Cited in the file of this patent

UNITED STATES PATENTS

| Number | Name | Date |
|---|---|---|
| 528,417 | Duckham | Oct. 30, 1894 |
| 1,498,630 | Jensen | June 24, 1924 |
| 1,549,285 | Baker | Aug. 11, 1925 |
| 2,054,441 | Peebles | Sept. 15, 1936 |
| 2,123,537 | Marr | July 12, 1938 |
| 2,487,961 | Angell | Nov. 15, 1949 |
| 2,493,911 | Brandt | Jan. 10, 1950 |

FOREIGN PATENTS

| Number | Country | Date |
|---|---|---|
| 180,397 | Great Britain | May 11, 1922 |
| 268,667 | Great Britain | Apr. 7, 1927 |
| 7,075 | Netherlands | June 15, 1922 |